(12) United States Patent
St-Cyr et al.

(10) Patent No.: US 9,885,181 B2
(45) Date of Patent: Feb. 6, 2018

(54) BENT REINFORCEMENT ROD HAVING IMPROVED MECHANICAL STRENGTH AT THE BENDING POINT THEREOF, AND METHOD FOR PRODUCING SAME

(71) Applicant: PULTRALL INC., Québec (CA)

(72) Inventors: Danny St-Cyr, Québec (CA); Alexandre Lallier, Québec (CA)

(73) Assignee: PULTRALL INC., Thetford Miles (CA)

( * ) Notice: Subject to any disclaimer, the term of this patent is extended or adjusted under 35 U.S.C. 154(b) by 0 days.

(21) Appl. No.: 14/387,175

(22) PCT Filed: Jan. 24, 2013

(86) PCT No.: PCT/CA2013/050046
§ 371 (c)(1),
(2) Date: Apr. 24, 2015

(87) PCT Pub. No.: WO2013/138921
PCT Pub. Date: Sep. 26, 2013

(65) Prior Publication Data
US 2015/0233119 A1    Aug. 20, 2015

(30) Foreign Application Priority Data

Mar. 23, 2012  (CA) ...................................... 2773042

(51) Int. Cl.
| | |
|---|---|
| *E04C 5/07* | (2006.01) |
| *B21D 7/022* | (2006.01) |
| *D02G 3/12* | (2006.01) |
| *D02G 3/36* | (2006.01) |
| *D02G 3/44* | (2006.01) |
| *D07B 1/16* | (2006.01) |
| *B29C 53/56* | (2006.01) |

(52) U.S. Cl.
CPC ................ *E04C 5/07* (2013.01); *B21D 7/022* (2013.01); *B29C 53/56* (2013.01); *D02G 3/12* (2013.01); *D02G 3/36* (2013.01); *D02G 3/44* (2013.01); *D07B 1/16* (2013.01)

(58) Field of Classification Search
CPC ...................................................... E04C 5/07
See application file for complete search history.

(56) References Cited

U.S. PATENT DOCUMENTS

| | | |
|---|---|---|
| 2,684,318 A | 7/1954 | Meek |
| 4,154,634 A | 5/1979 | Shobert et al. |

(Continued)

FOREIGN PATENT DOCUMENTS

| | | |
|---|---|---|
| CA | 2191241 A1 | 12/1995 |
| CA | 2 630 878 A1 | 11/2009 |

(Continued)

OTHER PUBLICATIONS

International Search Report for Application No. PCT/CA2013/050046, dated Apr. 2, 2013.

*Primary Examiner* — Larry Thrower
(74) *Attorney, Agent, or Firm* — Marshall, Gerstein & Borun LLP

(57) ABSTRACT

The invention relates to a bent rod having improved mechanical strength at the bending point thereof, characterized in that it is made from a bundle of twisted fibers that are secured together using a binder matrix preferably consisting of a thermosetting resin. The invention also relates to a method and device for producing said rod.

12 Claims, 3 Drawing Sheets

(56) References Cited

U.S. PATENT DOCUMENTS

| | | | |
|---|---|---|---|
| 4,296,060 | A | 10/1981 | Killmeyer et al. |
| 4,445,957 | A | 5/1984 | Harvey |
| 4,813,221 | A | 3/1989 | Christian et al. |
| 2001/0023568 | A1 | 9/2001 | Edwards et al. |
| 2007/0048493 | A1 | 3/2007 | Melancon |
| 2008/0141614 | A1 | 6/2008 | Knouff et al. |
| 2011/0192132 | A1 | 8/2011 | Kimura et al. |

FOREIGN PATENT DOCUMENTS

| | | |
|---|---|---|
| CA | 2 731 343 A1 | 4/2011 |
| WO | WO-98/31891 A1 | 7/1998 |

BENT REINFORCEMENT ROD HAVING IMPROVED MECHANICAL STRENGTH AT THE BENDING POINT THEREOF, AND METHOD FOR PRODUCING SAME

FIELD OF THE INVENTION

An object of the present invention is a bent reinforcement rod usable as reinforcement for reinforcing a component or a work of concrete, said rod having a mechanical resistance improved at the location of its curvature.

DESCRIPTION OF THE PRIOR ART

It is known in the field of construction to use curved rods made of a composite material in order to reinforce components or works of concrete.

Examples of such components and works are detailed hereinafter.

The production of such reinforcement rods made of a composite material is thus known and commercially exploited for many years. This production includes shaping a strand of fibers of polymeric, mineral, natural or metallic nature which are coated with a thermohardening resin, the winding of the strand on mounts supported by a rotating frame, the submitting of the strand thus rolled to a temperature sufficient to ensure the hardening of the resin and the optional cutting of the resulting rigid product into sections.

With respect to this known type of production, one can refer also to the American patents cited hereinafter.

U.S. Pat. No. 2,684,318 [Meek] describes a method for producing rigid rods by coating a bundle of glass fibers with a thermosetting resin, and pulling the previously coated fibers continuously through an oven so that the resin hardens.

U.S. Pat. No. 4,154,634 [Shobert] describes a method for producing rigid profiles by intermittently pulling a bundle of glass fibers previously coated with a thermosetting resin through at least one heating die so that the resin hardens.

U.S. Pat. No. 4,445,957 [Harvey] describes a method for producing curved shapes with a constant cross sectional area by pulling sections of a bundle of glass fibers previously coated with a thermosetting resin into heating molds that shape sections of said bundle into a curved shape while hardening the resin.

U.S. 2011/0192132 [Kimura et al.] describes a method for producing a flexible cable that can be easily wound by twisting strands of carbon fibers bonded together with a thermosetting resin.

U.S. 2008/0141614 [Knouff et al.] describes how a reinforcing rod with an ellipsoidal cross section can be twisted so that it can be easily bent before the resin that binds the fibers together is subjected to a heat treatment that causes it to harden.

U.S. Pat. No. 4,296,060 [Killmeyer et al.] describes a method for producing a rod in which at least a portion of the fibers forming at least one protrusion on the surface of the rod is subjected to a spiral motion by the rotation of two traction surfaces in relative rotation to one another.

SUMMARY OF THE INVENTION

The rod according to the invention distinguishes itself from existing rods described hereinabove basically in that the fibers forming its strand are twisted and affixed amongst each other by means of a binding matrix.

An object of the invention is thus a curved rod having a mechanical resistance improved at the location of its curvature, characterized in that it is made from a strand of fibers twisted and affixed amongst each other by means of a binding matrix.

In practice, the fibers can be of polymeric, synthetic, mineral, natural or metallic nature.

In practice also, the binding matrix can be of thermohardening, thermoplastic or mineral nature. Hence, it can be a thermohardening polymer, such as a polyester resin, vinylester, epoxy, polyurethane or phenolic, or a thermoplastic polymer, a metal in fusion or any other material capable of being used to affix fibers together.

The invention as claimed also has as an object a method for producing the curved rod described hereinabove having a mechanical resistance improved at the location of its curvature, said method comprising the following basic steps:

(i) pulling a set of fibers according to a movement of torsion through a bin containing a liquid matrix so as to form a strand of twisted fibers saturated with said matrix;

(ii) winding or not into a helix about this strand a thread or other medium in the clockwise direction and another thread or other medium in an anticlockwise direction so as to form a flexible envelope;

(iii) bending the rod about at least one folding mount, this bending giving the rod a curved portion at the level of said at least one mount;

(iv) putting into place the rod on said at least one mount, in conditions where the matrix binding the fibers can harden; and (v) when the binding matrix is sufficiently hardened, removing the rod from said at least one mount.

By "other medium" in step (ii) hereinabove, one understands, as way of examples, a threaded or non-threaded textile strip, a polymer or cellulose band, or a steel thread.

In practice, the rod obtained can be cut to have at least one section in the shape of "J", "U", "C" or "L", or a continuous and arbitrary sequence of such shapes.

The invention as claimed also further has as an object a device for putting into practice the method described hereinabove. This device is characterized in that it comprises:

a carrousel on which are mounted fiber spools from which originate one or several strand(s);

a bin filled with a liquid matrix in which the strand of twisted fibers finds itself saturated with said matrix;

a set of at least two spools for carrying out a winding into a helix of two threads about the strand of fibers saturated with said matrix, said spools displacing themselves by emptying their threads under tension according to a circular path about the saturated strand of fibers whose axis is that of the strand of fibers; and at least one bending mount optionally provided with a plurality of parallel segments in which the strand of fibers is wound in the form of a helix.

Preferably, the bin of liquid resin has an inlet provided with a rotating device forming a sealing joint, said device having holes through which the fibers pass.

Advantageously, the diameter of the holes through which pass the fibers originating from the spools of the carousel have a dimension which is sufficiently big to allow a sliding of the fibers originating from the carousel, but sufficiently small for restraining the flow of the liquid matrix from the saturation bin.

In practice, the carousel preferably has a revolution frequency which is variable and subject to the longitudinal displacement of the fibers. Advantageously also, the rotating device has a rotating rate identical to the rotating rate of the carousel.

The present invention as well as its advantages will be better understood upon reading the following non-restrictive description, in reference to the accompanying drawings.

DETAILED DESCRIPTION OF THE INVENTION

As previously indicated, the present invention has as an object a reinforcement rod for concrete, composed of fibers drenched in a binding matrix and comprising a central bundle of twisted fibers.

Figure 1A:
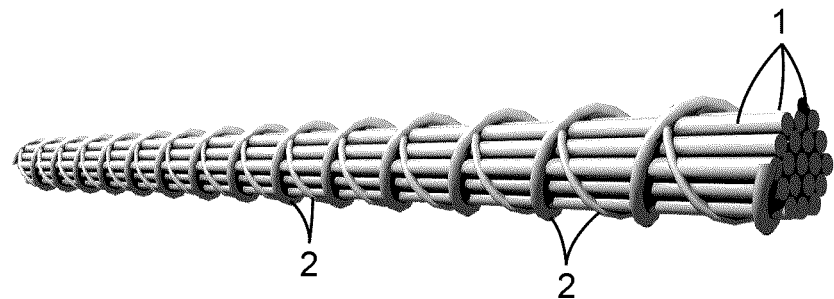
FIGS. 1a and 1b respectively show a strand of rectilinear fibers such as used in a classical construction rod and a strand of twisted fibers as used in the present invention.

To help in better understanding the description of the invention claimed, FIG. 1a shows a conventional and already known rod, which comprises a strand of rectilinear fibers (1) which are held amongst them provisionally by means of a flexible envelope composed of two wound threads (2).

Figure 1B:
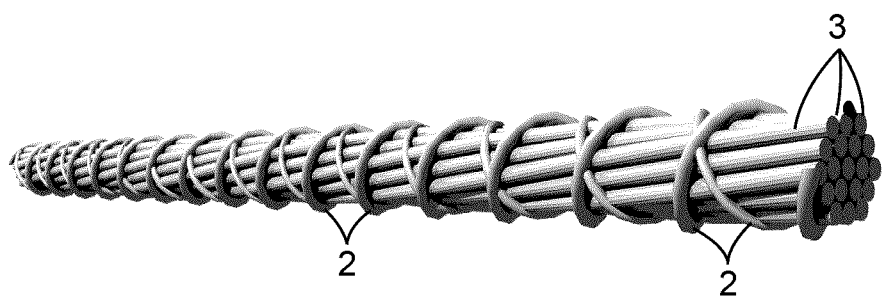

FIG. 1b shows a rod according to the invention which distinguishes itself from the conventional rod in that the fibers (3) of the strand are twisted and are held amongst each other provisionally by a flexible envelope composed of two wound threads (2).

Figure 2A:
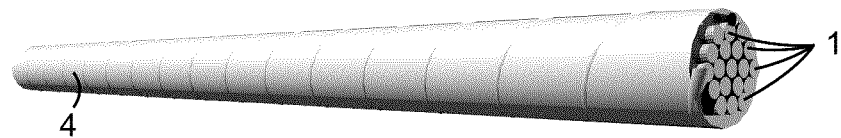
FIGS. 2a and 2b respectively show a portion of a rectilinear rod and a portion of a curved rod as they present themselves at the end of production.

FIG. 2a shows how the strand of twisted fibers and the flexible envelope composed of two wound threads such as illustrated in FIG. 1b, present themselves when everything is soaked with a binding matrix such as a thermohardening polymer (4) in its liquid form.

Figure 2B:
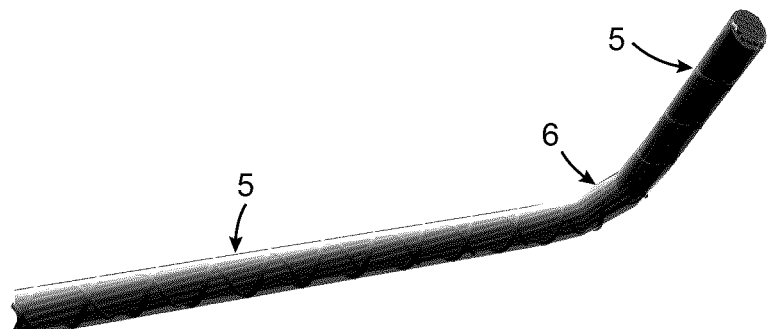

When the strand soaked with polymer (4) such as shown in FIG. 2a is bent and subjected to a suitable thermal treatment, it forms a curved rigid rod such as the one shown in FIG. 2b with rectilinear sections (5) or arbitrary curvatures (6).

Figure 3:
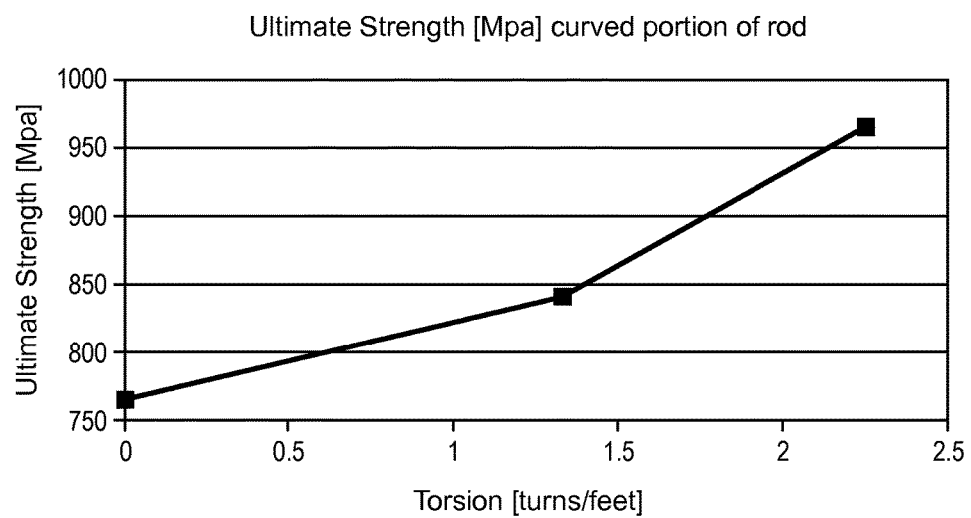
FIG. 3 is a graphic which shows the relation that exists between the degree of torsion of the fiber strand and the mechanical resistance of a rod manufactured by means of such a strand.

FIG. 3 demonstrates that the degree of torsion of the strand of fibers (3), such as shown in FIGS. 1b, 2a and 2b, enables to increase the mechanical resistance in the curved portion of a rod in comparison to a rod of conventional construction of same dimension and manufactured with the same materials. In the specific case illustrated in FIG. 3, the rod having been tested had a section of 71.3 mm$^2$ and had been built by means of a strand of 30 threads of roving of glass fibers saturated with polyester resin.

Figure 4:
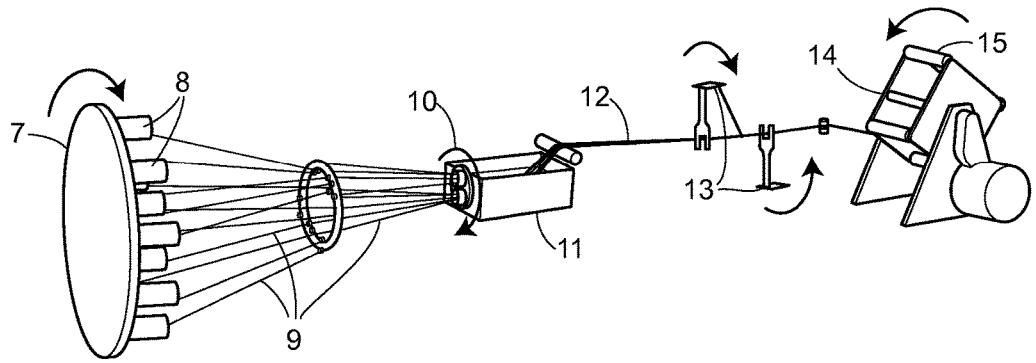
FIG. 4 shows the overview of the device which enables the production of a rod such as the one claimed in the present invention.

FIG. 4 shows the mechanical device through which such a rod can be manufactured. A carousel (7) which supports the multitude of spools (8) of glass fibers turns at the same speed as the perforated disk (10) through which the fibers (8) pass when they are pulled by the rotating disk (14). This pulling movement that unwinds the fibers (9) from the spools (8) makes the fibers pass in a bin (11) which is thus saturated with liquid matrix of said fibers. The strand (12) thus saturated with the liquid matrix becomes consolidated by two threads wound by the spools mounted on motorized arms (13) which turn about the strand, one in a clockwise direction and the other in an anticlockwise direction. The strand thus saturated and consolidated is wound by the mounts (15) mounted on the rotating disk (14). Afterwards, the disk (14) is subject in an oven to a thermal treatment that hardens the resins. The rod is removed from the mount and optionally cut to produce rigid and curved rods such as the one shown in FIG. 2b.

The invention claimed is:

1. A method for producing a curved rod having mechanical resistance at the location of its curvature, said method comprising the following steps:
   (i) pulling a set of fibers according to a movement of torsion through a bin containing a liquid matrix so as to form a strand of twisted fibers saturated with said matrix;
   (ii) winding into a helix about the strand of twisted fibers a thread or other medium in the clockwise direction and another thread or other medium in an anticlockwise direction so as to form a flexible envelope;
   (iii) bending the rod about at least one bending mount, giving the rod a curved portion at a level of said at least one mount;
   (iv) putting into place the rod placed on said at least one mount, in conditions where the matrix binding the fibers can harden; and
   (v) when the binding matrix is hardened, removing the rod from said at least one mount.

2. The method according to claim 1, and in pulling the fibers to form a strand, the fibers are twisted by means of at least one carrousel on which spools of said fibers are mounted.

3. The method according to claim 2, the carrousel having a revolution frequency which is variable and subject to the longitudinal displacement of the strand of fibers.

4. The method according to claim 2, and passing the fibers through holes made in a rotating device, forming a sealing joint at the inlet of the bin containing the liquid matrix.

5. The method according to claim 4, the rotating device having a rotation speed identical to the rotation speed of the at least one carrousel.

6. The method according to claim 4, the diameter of the holes through which pass the fibers originating from the spools of the carrousel having a dimension which is sufficiently large to let the fibers from the carrousel slide through, but sufficiently small to restrict the flow of the liquid matrix from the saturation bin.

7. The method according to claim 1, the winding into a helix of two threads around the strand of fibers saturated by the liquid matrix being accomplished by means of at least two spools that move by releasing their threads under tension along a circular path whose axis is that of the strand of fibers.

8. The method according to claim 1, the bending of the rod being made on at least two bending mounts on which the rod formed by the strand of fibers is wound into a loop.

9. The method according to claim 8, each bending mount being provided with a plurality of parallel segments in which the rod formed by the strand of fibers is wound in the form of a helix.

10. The method according to claim 1, the rod obtained being cut to have at least one section in the shape of "J", "U", "C" or "L", or a continuously and arbitrary sequence of such shapes.

11. A method for producing a curved rod having mechanical resistance at the location of its curvature, said method comprising the following steps:
   (i) pulling a set of fibers according to a movement of torsion through a bin containing a liquid matrix so as to form a strand of twisted fibers saturated with said matrix;
   (ii) winding into a helix about the strand of twisted fibers a thread or other medium in the clockwise direction and another thread or other medium in an anticlockwise direction so as to form a flexible envelope;
   (iii) bending the rod about at least one bending mount, giving the rod a curved portion at a level of said at least one mount;
   (iv) putting into place the rod placed on said at least one mount, in conditions where the matrix binding the fibers can harden; and
   (v) when the binding matrix is hardened, removing the rod from said at least one mount;
   (vi) in pulling the fibers to form a strand, twisting the fibers by means of at least one carrousel on which spools of said fibers are mounted; and
   (vii) bending of the rod on at least two bending mounts on which the rod formed by the strand of fibers is wound into a loop.

12. A method for producing a curved rod having mechanical resistance at the location of its curvature, said method comprising the following steps:
   (i) pulling a set of fibers according to a movement of torsion through a bin containing a liquid matrix so as to form a strand of twisted fibers saturated with said matrix;
   (ii) winding into a helix about the strand of twisted fibers a thread or other medium in the clockwise direction and another thread or other medium in an anticlockwise direction so as to form a flexible envelope;
   (iii) bending the rod about at least one bending mount, giving the rod a curved portion at a level of said at least one mount;
   (iv) putting into place the rod placed on said at least one mount, in conditions where the matrix binding the fibers can harden; and
   (v) when the binding matrix is hardened, removing the rod from said at least one mount;
   (vi) in pulling the fibers to form a strand, twisting the fibers by means of at least one carrousel on which spools of said fibers are mounted;
   (viii) bending of the rod on at least two bending mounts on which the rod formed by the strand of fibers is wound into a loop; and
   (ix) winding into a helix of two threads around the strand of fibers saturated by the liquid matrix being accomplished by means of at least two spools that move by releasing their threads under tension along a circular path whose axis is that of the strand of fibers.

* * * * *